United States Patent [19]

Pekarek et al.

[11] Patent Number: 4,908,782
[45] Date of Patent: Mar. 13, 1990

[54] AIRFOIL INSPECTION METHOD

[75] Inventors: Herbert C. Pekarek, Gates Mills; Richard D. Pryatel, Seven Hills, both of Ohio

[73] Assignee: Compressor Components Textron Inc., Cleveland, Ohio

[21] Appl. No.: 495,961

[22] Filed: May 19, 1983

[51] Int. Cl.$^4$ .................. G01B 11/24; G01B 21/20
[52] U.S. Cl. .................. 364/560; 33/546; 356/394; 364/550
[58] Field of Search .............. 364/550, 551, 559, 560; 33/545, 546; 356/1, 2, 376, 394

[56] References Cited

U.S. PATENT DOCUMENTS

| | | | |
|---|---|---|---|
| 3,894,802 | 7/1975 | Higgins | 356/376 |
| 4,024,646 | 5/1977 | Griggs | 33/174 P |
| 4,111,557 | 9/1978 | Rottenkolber et al. | 356/394 |
| 4,226,536 | 10/1980 | Dreyfus et al. | 356/376 |
| 4,233,625 | 11/1980 | Altman | 364/559 X |
| 4,296,474 | 10/1981 | Hurt | 364/560 |
| 4,298,285 | 11/1981 | Ito | 356/376 |
| 4,299,491 | 11/1981 | Waters et al. | 356/376 |
| 4,325,640 | 4/1982 | Dreyfus et al. | 356/376 |
| 4,373,804 | 2/1983 | Pryor et al. | 356/376 X |
| 4,381,548 | 4/1983 | Grossman et al. | 364/559 X |

OTHER PUBLICATIONS

Diffracto Advertising Brochure entitled "LaserProbe Digital Ranging Sensors".
Anorad Corporation Advertising Brochure entitled "Anoride" Positioning Tables.

Primary Examiner—Felix D. Gruber
Attorney, Agent, or Firm—Edward J. Timmer

[57] ABSTRACT

An improved inspection method determines how closely the cross sectional configuration of an airfoil corresponds to a reference cross sectional configuration. When an airfoil is to be inspected, the airfoil is measured and the mean camber line is determined. The mean camber lines of the reference and measured airfoils are shifted relative to each other through a plurality of relationships. A best fit relationship is determined in which the measured and reference airfoils overlie each other to a maximum extent possible. The best fit relationship can be determined by comparing points on the major side surfaces of the measured and reference airfoils. Alternatively, the best fit relationship can be determined by comparing points on the mean camber lines of the measured and reference airfoils.

17 Claims, 4 Drawing Sheets

_Fig-9_

_Fig-10_

_Fig-11_

_Fig-12_

_Fig-13_

_Fig-14_

AIRFOIL INSPECTION METHOD

BACKGROUND OF THE INVENTION

The present invention relates to a new and improved method of inspecting an airfoil to determine whether or not its dimensions fit within a tolerance range.

Airfoils, such as turbine blades and vanes, have previously been inspected by measuring the airfoil and comparing a cross sectional drawing of the airfoil to a cross sectional drawing of a reference airfoil. In practicing this known method of inspecting an airfoil, a cross section of the airfoil is measured to determine the location of selected points on the major side surfaces of the airfoil. These measurements are used to make a drawing representing the measured cross sectional configuration of the airfoil on an enlarged scale. In addition, a transparent overlay drawing is made, on the same scale, representing the desired airfoil configuration.

The transparent overlay of the reference airfoil is then manually moved relative to the drawing of the measured airfoil until the lines representing the major side surfaces of the measured airfoil have, in the opinion of the inspector, a best possible fit with the lines representing the major side surfaces of the reference airfoil. The distances by which preselected points on the overlay are offset from corresponding points on the reference drawing are then measured These measurements are checked to determine whether or not the cross sectional configuration of the measured airfoil corresponds to the cross sectional configuration of the reference airfoil within a preselected tolerance range.

This manual method of comparing cross sectional drawings of measured and reference airfoils is a slow and time consuming task. The manual checking process has an accuracy of, perhaps, 1/64th of an inch. Moreover, this manual inspecting process can not be repeated with a high degree of accuracy due to the subjectivity of the person comparing the two cross sectional drawings to determine what is a best fit between the overlay of the measured airfoil and the drawing of the reference airfoil. The degree of repeatability of the manual inspecting process is also adversely affected by judgments which must be made in measuring the distances between points on the overlay and reference drawings. Of course, the lack of repeatability makes it difficult for different parties to check whether or not an airfoil has been inspected properly and is actually within desired tolerances.

BRIEF SUMMARY OF THE INVENTION

The present invention provides a new and improved method for quickly and accurately inspecting an airfoil with a high degree of repeatability. When an airfoil is to be inspected, it is first measured and the mean camber line of the airfoil is determined from these measurements. An initial relationship is then established between the mean camber line for the measured airfoil and the mean camber line for a reference airfoil. The relationship between the measured airfoil mean camber line and the reference airfoil mean camber line is then changed through a plurality of relationships to determine a best fit relationship in which surfaces of the measured and reference airfoils overlie each other to the maximum extent possible.

In the initial relationship, the leading end of one of the mean camber lines is disposed on the other mean camber line and the trailing end of the other mean camber line is disposed on the one mean camber line. The mean camber lines are then shifted relative to each other through a plurality of relationships. In each of these relationships, the leading end of one of the mean camber lines is disposed on the other mean camber line and the trailing end of the other mean camber line is disposed on the one mean camber line.

To determine a best fit relationship, the extent to which points on surfaces of the measured airfoil are offset relative to corresponding points on surfaces of the reference airfoil is determined for each of the plurality of relationships between the mean camber lines. Alternatively, if desired, a best fit relationship may be determined by determining the extent to which points on the mean camber line of the measured airfoil are offset relative to corresponding points on the mean camber line of the reference airfoil for each of the plurality of relationships between the mean camber lines. Although it is preferred to use the mean camber lines for comparison purposes, other lines having configurations which are functions of the configurations of the major side surfaces of the airfoils could be used if desired.

Accordingly, it is an object of this invention to provide a new and improved method which can quickly determine with a high degree of repeatability, how closely the cross sectional configuration of an airfoil corresponds to a reference cross sectional configuration.

Another object of this invention is to provide a new and improved method of inspecting an airfoil by establishing a plurality of different relationships between the mean camber line of a measured airfoil and a mean camber line for a reference airfoil and determining at which of the relationships there is a best fit condition in which surfaces of the airfoils overlie each other to the maximum extent possible.

Another object of this invention is to provide a new and improved method of determining how closely the cross sectional configuration of a measured airfoil corresponds to the cross sectional configuration of a reference airfoil by establishing a plurality of relationships between a line having a configuration corresponding to the configuration of major side surfaces of the measured airfoil and a line having a configuration corresponding to the configuration of major side surfaces of the reference airfoil and determining for which of the relationships there is a minimum deviation between points on the major side surfaces of the airfoils.

Another object of this invention is to provide a new and improved method of determining how closely the cross sectional configuration of a selected airfoil corresponds to the cross sectional configuration of a reference airfoil which includes establishing between the airfoil mean camber lines a plurality of relationships in each of which the leading end of one of the mean camber lines is on the other mean camber line and the trailing end of the other mean camber line is on the one mean camber line.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Airfoil Measurement Apparatus

A known airfoil measurement apparatus 20 (FIG. 1) is used to measure a known airfoil 22. The output from the airfoil measurement apparatus 20 is transmitted to a computer 24 (FIG. 2) to determine if the dimensions of the airfoil 22 fit within a preselected tolerance range. Data indicating the measured cross sectional configuration of the airfoil 22 and the extent to which the measured configuration of the airfoil deviates from the configuration of a reference airfoil is transmitted from the computer 24 to a printer 26. A plotter 28 may advantageously be connected with the computer 24 to provide a visual indication of the configuration of the measured airfoil 22.

The airfoil measurement apparatus 20 includes a fixture 32 (FIG. 1) which grips the airfoil 22. The fixture 32 is mounted on a vertical or Z axis slide 34 which is driven by a motor 36 to move the airfoil 22 vertically relative to a base 38. A drive motor 42 is connected with the fixture 32 and is operable to rotate the fixture about a vertical central or stacking axis of the airfoil 22.

Figure 1:
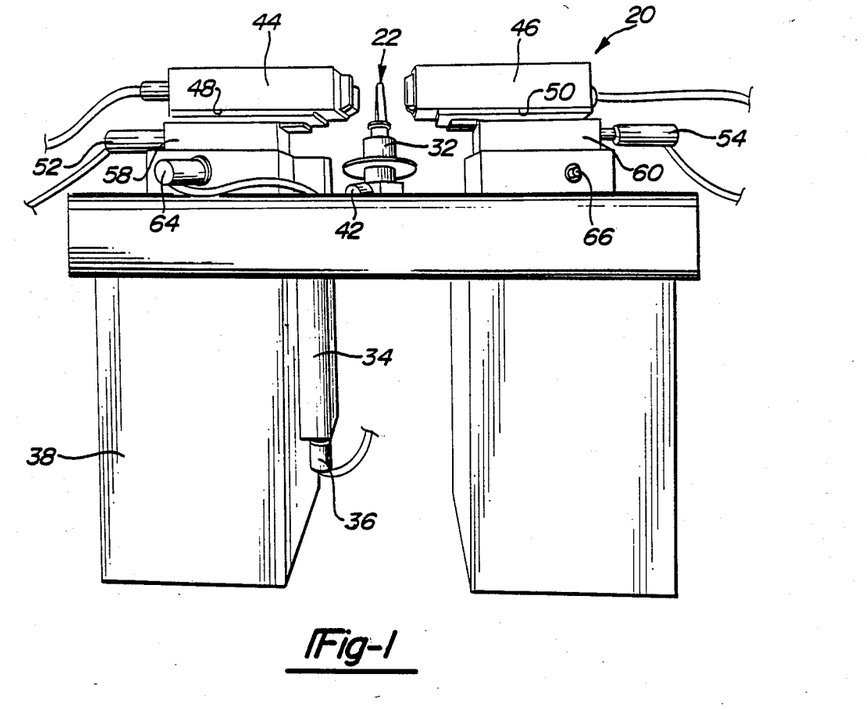
FIG. 1 is a pictorial illustration of an apparatus for measuring an airfoil.

The cross sectional configuration of the airfoil 22 is detected by left and right sensor assemblies 44 and 46. The sensor assemblies 44 and 46 are mounted, at the same level, on Y axis slides 48 and 50 which are moved toward and away from the airfoil 22 along horizontal paths by operation of motors 52 and 54. The Y axis slides 48 and 50 are mounted on X axis slides 58 and 60 which are operable to move the sensor assemblies 44 and 46 along a X axis extending perpendicular to the Y axis. The left X axis slide 58 is moved along a horizontal path by a drive motor 64. The right X axis slide 60 is moved along a horizontal path by a similar drive motor (not shown) which is operable to rotate a screw 66.

It is contemplated that the X, Y and Z axes slides 58, 60 and 34 could have many different constructions. However, in one specific embodiment of the invention, the cross slides were "ANORIDE" positioning tables manufactured by the Anorad Corporation of 115 Plant Avenue, Smithtown, N.Y. 11787, United States of America. Of course, the slides could have a construction other than this specific construction if desired.

The left and right sensor assemblies 44 and 46 (see FIG. 2) detect the cross sectional configuration of the airfoil 22 in a horizontal measurement plane which extends perpendicular to the central axis of the airfoil 22. The sensor assemblies 44 and 46 include lasers 72 and 74. The lasers 72 and 74 direct collimated beams 76 and 78 of light along horizontal paths, disposed in a measurement plane, onto the concave and convex major side surfaces 80 and 82 of the airfoil 22. The light is reflected from the airfoil side surfaces 80 and 82 through lenses 84 and 86 to solid state sensors 88 and 90.

Although it is preferred to use the sensor assemblies 44 and 46 to sequentially detect the cross sectional configuration of the airfoil 22 in each of a plurality of horizontal measurement planes at spaced apart locations along the vertical axis of the airfoil 22, it is contemplated that other types of sensors or gauges could be used if desired. In one specific embodiment of the invention, the sensor assemblies 44 and 46 were 200-series "LASERPROBES" manufactured by Diffracto of 2775 Kew Drive, Windsor, Ontario, Canada N8T 3B7.

Figure 2:
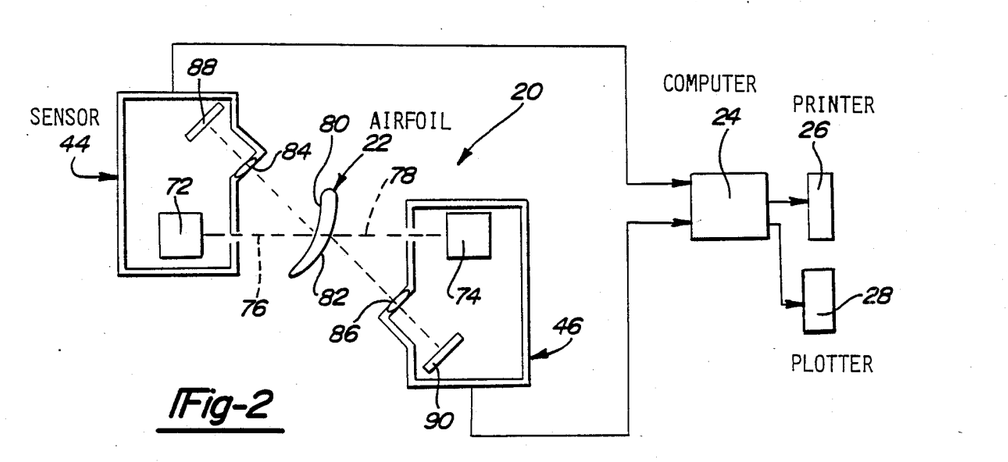
FIG. 2 is a schematic illustration depicting the relationship between an airfoil whose cross sectional configuration is being measured, sensor assemblies for detecting the location of points on the surface of the airfoil, and a computer connected with the sensor assemblies.

The output from the solid state sensors 88 and 90 is transmitted to the computer 24. The computer 24 is programmed to determine at which location data representing the locations of measured points on the airfoil 22 has a minimum deviation from data representing corresponding points on a reference or model airfoil. The output from the computer 24 is transmitted to a printer 26.

The printer 26 prints out data indicating the extent to which the location of points on the surfaces 80 and 82 of the airfoil 22 deviate from the location of corresponding points on a reference airfoil. The output from the printer 26 also indicates the amount by which the twist of the measured airfoil 22 deviates from the twist of the reference airfoil. A plotter 28 is connected with the computer 24 to provide cross sectional drawings illustrating the configuration of the airfoil 22.

In one specific embodiment of the invention, the computer 24 was a model PDP 11/60 computer obtained from Digital Equipment Company of Maynard, Mass., United States of America. This specific computer includes the printer 26. In one specific embodiment of the invention, the plotter 28 was a model 42 "SUPERPLOTTER" obtained from Gerber Scientific Instrument Company of Hartford, Conn., United States of America. Of course, other types of computers, printers and plotters could be used if desired.

Airfoil

Figure 3:
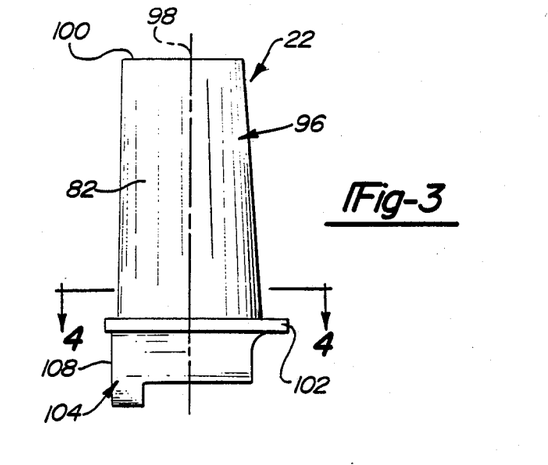
FIG. 3 is an illustration of the airfoil being measured in FIGS. 1 and 2.
Figure 4:
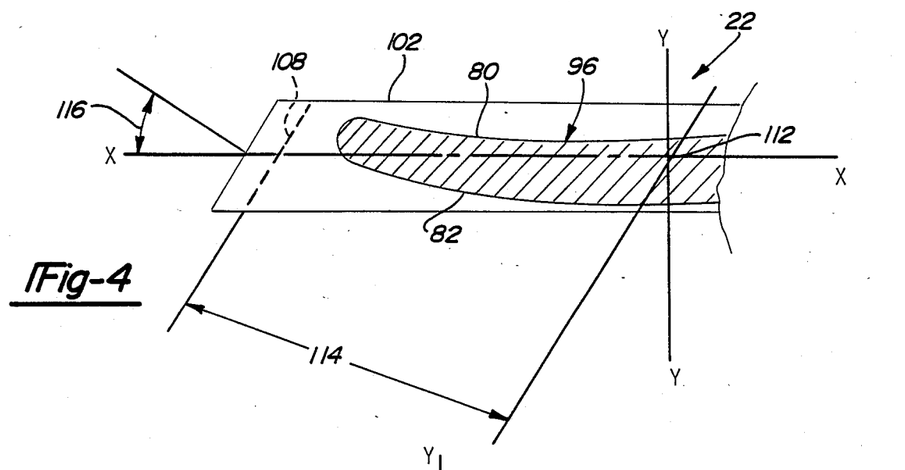
FIG. 4 is a fragmentary sectional view, taken generally along the line 4—4 of FIG. 3, further illustrating the construction of the airfoil.

The airfoil 22 (see FIGS. 3 and 4) has a blade 96 with a central or stacking axis 98. The blade 96 has a concave major side surface 80 and a convex major side surface 82 (FIG. 4). The major side surfaces extend from a tip end 100 (FIG. 3) of the blade 96 to a platform 102. A root or base 104 of the airfoil is connected with the platform 102. A reference or datum surface 108 is accurately machined on the root or base 104 and provides a reference surface for locating the airfoil 22 in the holder 32.

The reference surface or datum plane 108, along with surfaces of the root 104 which are parallel to the X axis, provides a basis for establishing orthogonal X and Y axes (see FIG. 4). The origin 112 of the X and Y axes is located a predetermined distance 114 from the datum plane 108. The distance 114 is measured along a line extending perpendicular to the datum plane 108. The angle 116 which a line perpendicular to the datum plane 108 makes with the X axis is referred to as the end angle. The end angle 116 is equal to the angle by which the Y axis is offset from a line extending parallel to the datum plane 108.

Measuring the Airfoil

When the airfoil 22 is to be measured by the apparatus 20, the airfoil is gripped in the holder 32 (FIG. 1) with the datum plane 108 in abutting engagement with a reference surface in the holder to accurately locate the airfoil 22 relative to the holder. The motor 36 is then operated to move the vertical or Z axis slide 34 to position the airfoil 22 with a preselected point on the vertical central axis 98 in the measurement plane.

Once the airfoil 22 has been vertically positioned relative to the sensor assemblies 44 and 46, the motor 42 (see FIG. 1) is operated to rotate the holder 32 in a stepwise manner about the vertical axis 98. The X and Y axis slides 48, 50, 58 and 60 are moved along horizontal paths. This results in the light beams 76 and 78 being sequentially directed to predetermined points disposed on the major side surfaces 80 and 82 (FIG. 2) of the airfoil 22 in the measurement plane. The collimated light beams 76 and 78 (see FIG. 2) are projected from the lasers 72 and 74 and reflected back to the sensors 88 and 90 while remaining in the measurement plane. At this time, the central or stacking axis 98 (see FIG. 3) of the airfoil 22 extends through the origin 112 (see FIG. 4) of the X and Y axes.

Figure 5:
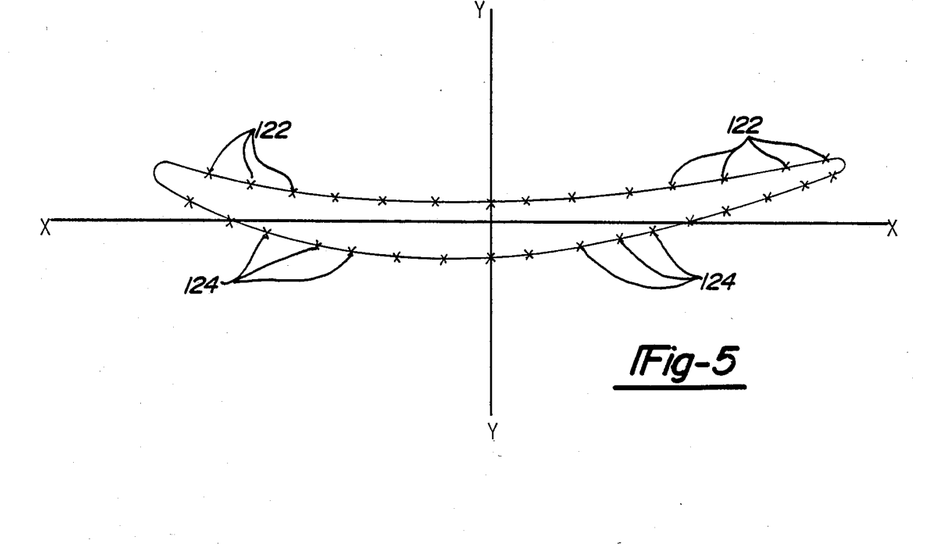
FIG. 5 is a plot, on an enlarged scale, of measured points on the major side surfaces of the airfoil of FIG. 3.

By operating the motor 42 to rotate the airfoil 22 through incremental steps and the X and Y axis slide motors 52, 54 and 64 to move the sensor assemblies 44 and 46 through incremental steps, data is transmitted from the sensor assemblies 44 and 46 to the computer 24 to indicate the locations of a plurality of points on the major side surfaces 80 and 82 of the airfoil 22. Thus, a plurality of points 122 (see FIG. 5) are located on the concave major side 80 of the airfoil 22 and a plurality of points 124 are located on the convex side 82 of the airfoil. By curvilinear interpolation, the computer 24 determines the cross sectional configuration of the major side surfaces 80 and 82 of the airfoil 22 in the horizontal measurement plane.

Airfoil Tolerances

In order to be acceptable for use in an engine, the airfoil 22 must have dimensions which are within predetermined tolerance ranges. Thus, the twist of the airfoil 22 must be within an angular tolerance range indicated at 130 in FIG. 6. If the airfoil blade 96 (FIG. 4) is twisted excessively relative to the datum plane 108 so that the X and Y axes are outside of the angular tolerance range indicated at 130 in FIG. 6, the airfoil 22 would not be acceptable for use in an engine.

Figure 6:
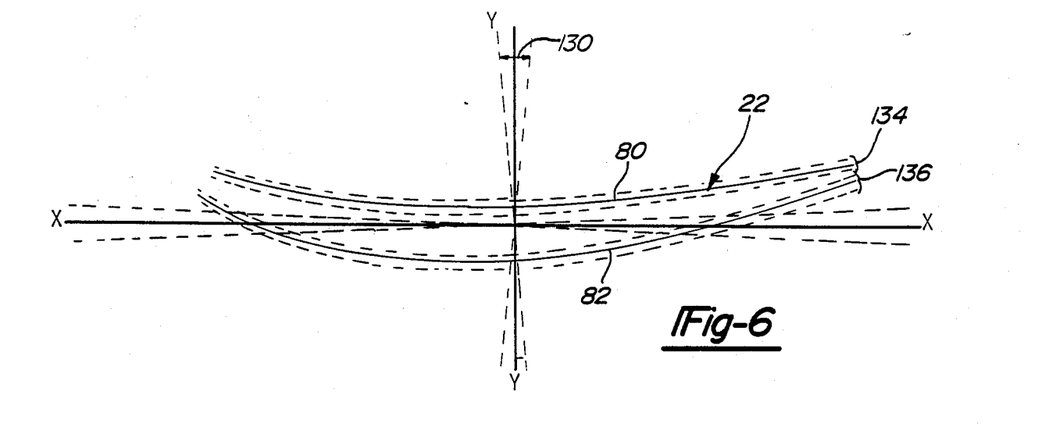
FIG. 6 is a schematic illustration depicting tolerance ranges for the form of the major side surfaces and the twist of the airfoil of FIG. 3 about its central axis.

The major side surfaces 80 and 82 of the airfoil 22 must have cross sectional configurations that are within predetermined tolerance ranges indicated at 134 and 136 in FIG. 6. If the form of the airfoil 22 is such that the major side surfaces 80 and 82 do not fit within the tolerance ranges indicated at 134 and 136 in FIG. 6, the airfoil 22 would not be acceptable for use in an engine. Of course if the airfoil 22 is twisted so as to just barely be within the tolerance range 130, this will effect the location of the major side surfaces 80 and 82 in the tolerance ranges 134 and 136.

The tolerance ranges for a particular airfoil 22 will be a function of the operating conditions under which the airfoil is to be used. Thus, if the airfoil 22 is to be used in relatively severe operating conditions, the tolerances ranges 130, 134 and 136 would be relatively small. Although the magnitude of the tolerances ranges 130, 134 and 136 will be different for different airfoils, a typical twist tolerance range 130 would be ±0.500 of a minute. Typical form tolerance ranges 134 and 136 would be ±0.005 of an inch. A chord length of an airfoil having these typical tolerance ranges would be about 1½ inches. The cord length is the straight line distance between the leading and trailing edges of the airfoil, that is the straight line distance between an extreme leading edge point and an extreme trailing edge point. It should be understood that the foregoing specific tolerance ranges and chord length have only been set forth for purposes of clarity of illustration and it is not intended to limit the invention to any particular tolerance ranges or chord length values.

In order to determine whether or not the airfoil 22 is within its design tolerance ranges and acceptable for use in an engine, the airfoil must be measured and compared with a reference airfoil. The relationship between a measured airfoil 22 and a reference airfoil 142 has been greatly exaggerated in FIG. 7 for purposes of clarity of illustration. The configuration of the measured airfoil 22 has been indicated in dashed lines in FIG. 7. The configuration of the reference or model airfoil 142 has been indicated in solid lines in FIG. 7. Of course, an actual airfoil 22 would not differ from the reference airfoil 142 by the large amounts shown in FIG. 7.

Figure 7:
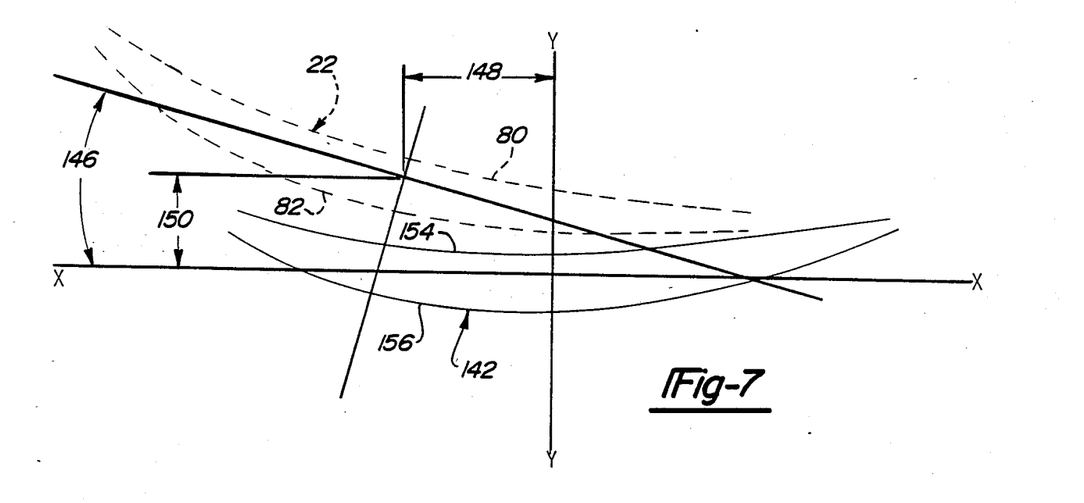
FIG. 7 is an exaggerated illustration schematically depicting the manner in which major side surfaces of a measured airfoil are offset from major side surfaces of a reference airfoil.

The measured airfoil 22 has a twist which differs from the twist of the reference airfoil 142 by a angular amount indicated at 146 in FIG. 7. In addition, the airfoil 22 has an X axis displacement, indicated by a distance 148 in FIG. 7, from the reference airfoil 142. Similarly, the measured airfoil 22 is displaced a distance, indicated at 150 in FIG. 7, along the Y axis relative to the reference airfoil 142.

In order to determine the amount by which the measured airfoil 22 deviates from the reference airfoil 142, the computer 24 shifts the data for the measured airfoil 22 relative to the data for the reference airfoil 142 until the deviation between the two sets of data is minimized. Once this has been done, a best fit condition in which contour deviations are minimized has been obtained. When the best fit condition has been determined, the computer 24 compares the two sets of data for the airfoils 22 and 142 to determine the amount by which the measured airfoil 22 deviates from the reference airfoil 142. This enables a determination to be made as to whether or not the measured airfoil 22 is within the tolerance ranges 130, 134 and 136.

In order to minimize scrap, the computer 24 can reposition the data for the measured airfoil 22 relative to the data for the reference airfoil 142 to bring one or more points on the measured airfoil which are out of the tolerance ranges within the tolerance ranges. Although this increases the extent of deviation of some points on the measured airfoil 22 from the corresponding points on the reference airfoil 142, it may result in all of the points on the measured airfoil being within the tolerance ranges. If this can be done, the measured airfoil would be acceptable for use in an engine even though a point on the measured airfoil is outside of the tolerances at a best fit condition.

At a best fit condition, the twist of the measured airfoil 22 might be within the center of the tolerance range 130 and a point on a major side surface 80 outside of the tolerance range 134. The data for the measured airfoil 22 would then be displaced slightly in an effort to bring all of the points on the measured airfoil 22 within the tolerance ranges. This could be done by shifting the data for the measured airfoil 22 to increase the extent to which the twist of the measured airfoil 22 differs from the twist of the reference airfoil 142 within the tolerance range 130. This rotational effect would move the previously out of tolerance point on the major side surface 80 within the tolerance range 134 without moving any of the points on the airfoil out of the tolerance ranges 134 and 136. This minimizes unnecessary scrap since a determination of whether or not the measured airfoil 22 meets the required tolerances is done under conditions which are most favorable to the measured airfoil 22.

Mean Camber Line

When the measured airfoil 22 is compared with the reference airfoil 142, the form of both of the major side surfaces 80 and 82 of the measured airfoil must be compared with the form of major side surfaces 154 and 156 of the reference airfoil 142. In accordance with a feature of the present invention, the best fit condition between the measured airfoil 22 and the reference airfoil 142 is determined through the use of mean camber lines having configurations which are a function of the configurations of the major sides 80 and 82 of the measured airfoil 22 and the major sides 154 and 156 of the reference airfoil 142. This enables the four major sides 80, 82, 154 and 156 of the airfoils 22 and 142 to be simultaneously compared by the computer 24.

Figure 8:
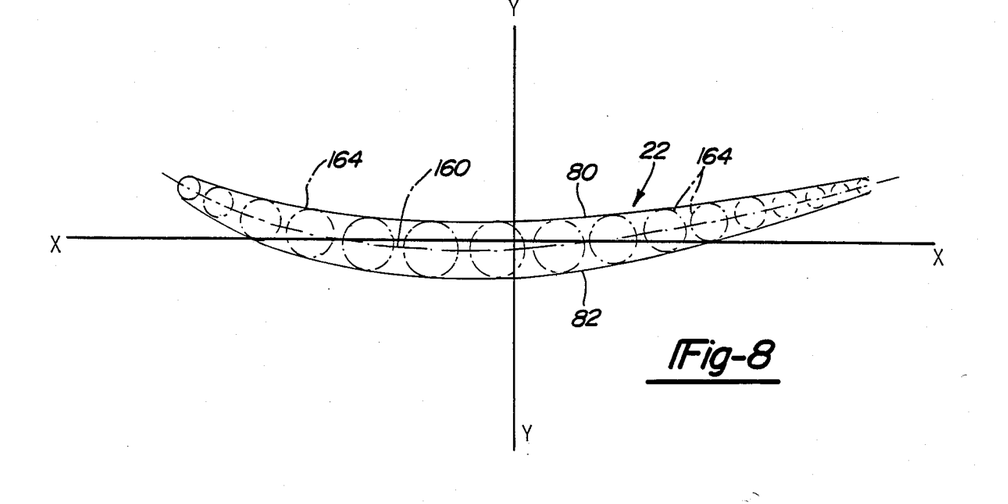
FIG. 8 is a schematic illustration depicting the relationship between the major side surfaces of an airfoil and the mean camber line of the airfoil.

A mean camber line 160 of the measured airfoil 22 (see FIG. 8) has a configuration which is a function of the configurations of the major side surfaces 80 and 82 of the measured airfoil. Thus, the mean camber line 160 of the measured airfoil 22 is a line having a curvature which is the average curvature of the two major side surfaces 80 and 82 of the measured airfoil. The mean camber line 160 is calculated as the locus of centers of inscribed circles 164. The inscribed circles 164 are tangential to both of the major sides 80 and 82 of the airfoil 22.

Figure 9:
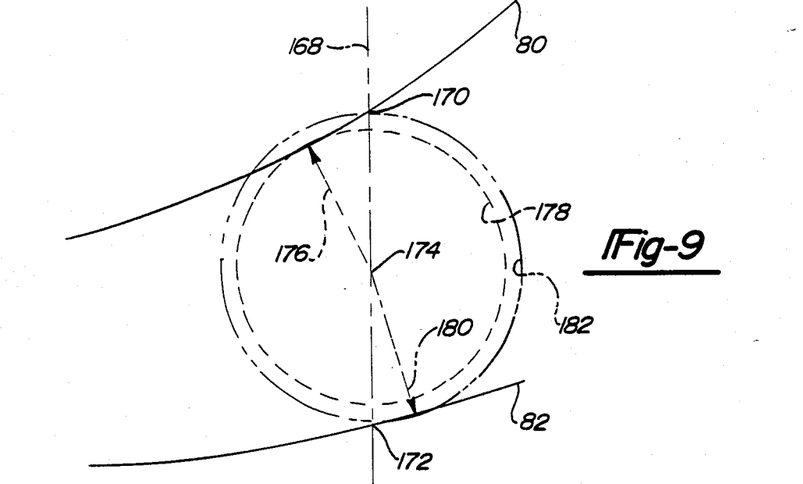
FIG. 9 is a schematic illustration depicting the manner in which the mean camber line shown in FIG. 8 is determined.

The manner in which the location of a center of an inscribed circle 164 is determined by the computer 24 is illustrated schematically in FIG. 9. To determine the center of one of the inscribed circles 164, a line 168 is erected parallel to the Y axis. The line 168 intersects the major side surfaces 80 and 82 at the points 170 and 172. A point 174 midway between the two points 170 and 172 is selected for a first trial center. A radius 176 extending through the center 174 and perpendicular to the major side surface 80 is selected for the radius of a first circle 178. A radius 180 extending through the center 174 and perpendicular to the major side surface 82 is selected for the radius of a second circle 182 extending tangentially to the side surface 82.

If the two radii 176 and 180 are equal, the center 174 is the center of an inscribed circle 164. However, if the radii 176 and 180 are of different lengths, as illustrated in FIG. 9, the location of a new trial center 174 is determined by trigonometric calculations. However, if desired, the new trial center 174 could be determined by shifting the center along the line 168 through a distance equal to half the difference between the two radii 176 and 180. The procedure is then repeated with trial centers until the lengths of the radii are equal. When this occurs, an inscribed circle is declared to have been formed.

The computer 24 can determine the centers of numerous other inscribed circles for the measured airfoil 22 in the same manner as previously explained in connection with FIG 9. Once a plurality of points along the mean camber line 160 have been located by determining the centers of a plurality of the inscribed circles 164, the mean camber line can be located by a process of curvilinear interpolation. Thus, the mean camber line 160 is a line which extends through the centers of inscribed circles 164 which are tangential to both of the major sides 80 and 82 of the airfoil 22.

Comparing Airfoils

Once the mean camber line 160 for the measured airfoil 22 has been determined, the computer 24 establishes a plurality of relationships between the mean camber line 160 with a mean camber line 200 (see FIG. 10) for the reference airfoil 142 by a curve slide or shifting technique. The curve slide technique shifts the position of the mean camber lines 160 and 200 relative to each other through a plurality of relationships in order to enable a best fit condition to be determined. A best fit condition is one in which the major side surfaces of the measured and reference airfoils 22 and 142 overlie each other to the maximum extent possible so that contour deviations between the airfoils are minimized.

The manner in which the slide technique is used by the computer 24 to determine a best fit condition is illustrated schematically in FIGS. 10-14. In practicing the curve slide technique, the leading end 204 and trailing end 206 of the mean camber line 160 of the measured airfoil 22 are determined. Corresponding leading and trailing ends 208 and 210 for the mean camber line 200 of the reference airfoil are determined. The leading and trailing ends of the mean camber lines 160 and 200 are at the intersection of the mean camber lines with the leading and trailing edges of the airfoils 22 and 142. Of course arbitrary leading and trailing ends for the mean camber lines 160 and 200 could be selected if desired.

Figure 10:
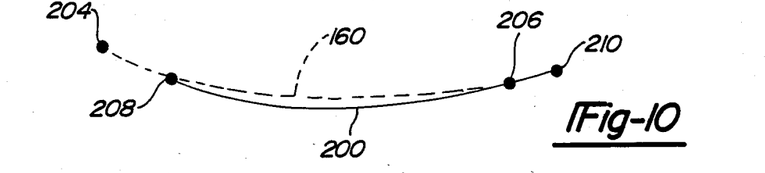
FIG. 10 is a schematic illustration depicting the relationship between the mean camber line for the reference airfoil and the mean camber line for the measured airfoil.

The data for the mean camber lines is then shifted so that the leading end of one of the camber lines is on the other camber line and the trailing end of the other camber line is on the one camber line. For example, the data is shifted so that the leading end 208 of the reference airfoil mean camber line 200 is disposed on the mean camber line 160 for the measured airfoil (FIG. 10). The trailing end 206 of the measured airfoil mean camber line 160 is positioned on the reference airfoil mean camber line 200. The extent of the deviation between points on the major side surfaces 80 and 82 of the measured airfoil 22 and corresponding points on the major side surfaces 154 and 156 of the reference airfoil are then determined.

Figure 11:
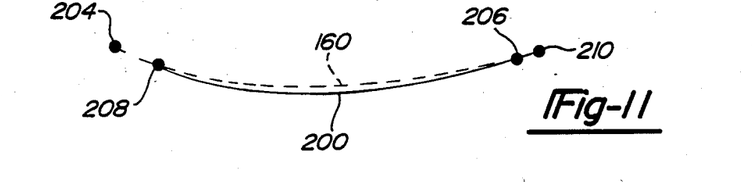
FIG. 11 is a schematic illustration depicting the mean camber lines of FIG. 10 after one of the camber lines has been shifted one increment to the right.

The computer 24 then shifts the data for the mean camber line 160 through one increment to the right relative to the mean camber line 200 while maintaining the leading end 208 of the reference mean camber line 200 on the measured mean camber line 160 and the trailing end 206 of the measured mean camber line on the reference mean camber line 200 (see FIG. 11). The extent of the deviation between corresponding points on the major side surfaces of the airfoils 22 and 142 is then determined.

Figure 12:
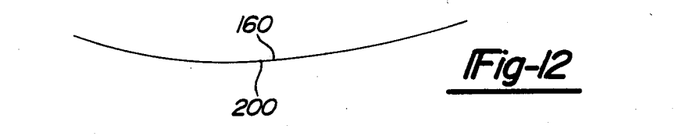
FIG. 12 is a schematic illustration depicting one of the mean camber lines of FIG. 11 shifted two increments to the right to a best fit condition in which they overlie each other.

The data for the camber line 160 is then shifted two increments to the right (see FIG. 12). When this has been done for the typical mean camber lines shown in FIGS. 10-14, the measured airfoil mean camber line 160 overlies the reference airfoil mean camber line 200 almost perfectly. The extent to which points on the major side surfaces of the measured airfoil 22 are offset from points on the major side surfaces of the reference airfoil 142 are determined for the condition shown in FIG. 12.

Figure 13:
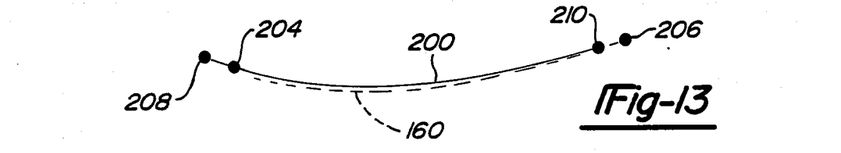
FIG. 13 is schematic illustration depicting one of the mean camber lines of FIG. 12 shifted one increment to the right.
Figure 14:
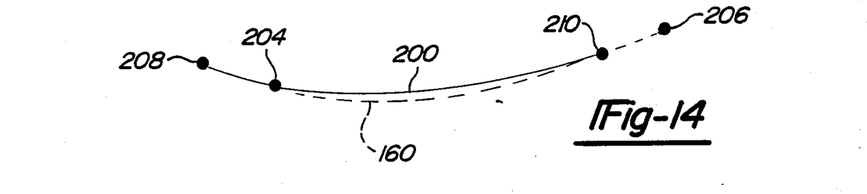
FIG. 14 is a schematic illustration depicting one of the mean camber lines of FIG. 13 shifted two increments to the right.

The computer then shifts the data for the mean camber line 160 through one increment to the right from the relationship shown in FIG. 12 to the relationship shown in FIG. 13. The deviation between the major side surfaces of the two airfoils 22 and 142 is then determined. The data for the mean camber line 160 is shifted through two increments to the right from the relationship shown in FIG. 13 to the relationship shown in FIG. 14. The deviation between the major sides of the two airfoils is then determined.

When the mean camber lines 160 and 200 were in the relationship shown in FIG. 11, the trailing end 206 of the mean camber line 160 was on the mean camber line 200 and the leading end 208 of the mean camber line 200 was on the mean camber line 160. When the mean camber lines were changed to the relationship shown in FIG. 13, the leading end 204 of the mean camber line 160 was on the mean camber line 200 and the trailing end 210 of the mean camber line 200 was on the mean camber line 160. Of course, the mean camber lines 160 and 200 could be shifted in the opposite direction relative to each other if desired. However, in each of the relationships, a leading end of one of the mean camber lines 160 or 200 is on the other mean camber line and a trailing end of the other mean camber line is on the one mean camber line.

For the mean camber lines 160 and 200 illustrated in FIGS. 10-14, it is apparent that a best fit condition for the mean camber lines is obtained in FIG. 12. Since the configuration of the mean camber lines 160 and 200 is determined by the configurations of the major side surfaces of measured airfoil 22 and reference airfoil 142, there may be a best fit condition between the major sides of the measured airfoil 22 and reference airfoil 142 when there is a best fit condition between the mean camber lines 160 and 200.

In order to be certain that a best fit condition is obtained between the major side surfaces 80 and 82 of the measured airfoil 22 and the major side surfaces 154 and 156 of the reference airfoil 142, it is preferred to determine the extent to which points on the major side surfaces of the measured airfoil are offset from corresponding points on the major side surfaces of the reference airfoil for each of the plurality of relationships between the mean camber lines 160 and 200 shown in FIGS. 10-14. The best fit condition is determined as being the condition in which the deviation or offset of points on the major side surfaces of the measured airfoil 22 is a minimum relative to corresponding points on the major side surfaces of the reference airfoil 142.

However, if desired, the best fit condition between the mean camber lines 160 and 200 could be accepted as being the best fit condition between the airfoils 22 and 142. If this was done, the extent to which points on the measured airfoil mean camber line 160 are offset from corresponding points on the reference airfoil mean camber line 200 would be determined for each of the plurality of relationships between the mean camber lines. If the best fit relationship between the mean camber lines 160 and 200 is accepted as indicating the best fit relationship between the airfoils 22 and 142, the extent to which points on the major side surfaces 80 and 82 of the measured airfoil 22 are displaced from corresponding points on the reference airfoil 142 would be determined while the mean camber lines are in the best fit condition of FIG. 12.

In addition to determining the extent to which the form of the cross section of the measured airfoil 22 differs from the form of a section of the reference airfoil 142, it is necessary to determine the amount by which the mean camber lines 160 and 200 were offset relative to each other to obtain the best fit condition shown in FIG. 12. This is accomplished by determining the amount which the origin 112 (FIG. 4) of the X and Y axes of the measured airfoil 22 is offset from its initial position when the airfoils 22 and 142 have the best fit condition. In addition, the extent to which the X and Y axes of the measured airfoil are angularly offset or twisted relative to the X and Y axes of the reference airfoil must be determined.

When the computer 24 (FIG. 2) has made these determinations, the information is transmitted to the printer 26 which provides a printout indicating the extent of deviation of the measured airfoil 22 from the desired configuration and whether or not the measured airfoil is within the tolerance ranges 130, 134 and 136 (FIG. 6). The plotter 28 provides a visual drawing indicating the configuration of the measured airfoil and may be used to also indicate the relationship of the measured airfoil 22 to the reference airfoil.

It is contemplated that the measured airfoil 22 may be only slightly out of the tolerance ranges 130, 134 and 136 at the best fit condition. In order to minimize scrap, the computer 24 determines whether or not the airfoil would be within the tolerance ranges 130, 134 and 136 at a condition which, while not being a best fit condition, results in the airfoil being within the tolerance ranges. Although there is a relatively small mean deviation for the best fit condition, there may be an overall fit of the airfoil 22 to the tolerance ranges 130, 134 and 136 which is better than the fit which is obtained in the best fit condition.

Although the explanation of how the mean camber line 160 for the measured airfoil 22 is determined and how the best fit condition for the airfoils is determined is relatively lengthy, the computer 24 can make these determinations very quickly. This enables the computer to provide an indication of whether or not an airfoil is within the tolerance ranges 130, 134 and 136 in less than two minutes. Since the determination is done with numerical data by the computer 24, there is a high degree of repeatability in the determination of whether or not an airfoil is within the tolerance ranges. This enables an inspection to be performed at one time and to be subsequently repeated with the same results at another time. It is believed that the inspection process can be repeated with an accuracy within ±0.0001 of an inch or less.

Although it is preferred to use the mean camber lines 160 and 200 in determining the best fit condition between the measured airfoil 22 and reference airfoil 142, it is contemplated that other lines could be used if desired. Of course, these other lines would have configurations which are functions of the configurations of the major side surfaces of the airfoils 22 and 142.

Conclusion

The present invention provides a new and improved method for quickly and accurately inspecting an airfoil 22 with a high degree of repeatability. When an airfoil 22 is to be inspected, it is first measured and the mean camber line 160 of the airfoil is determined from these measurements. An initial relationship is then established between the mean camber line 160 for the measured airfoil 22 and the mean camber line 200 for a reference airfoil 142. The relationship between the measured airfoil mean camber line 160 and the reference airfoil mean camber line is then changed through a plurality of relationships (FIGS. 10-14) to determine a best fit relationship in which surfaces of the measured and reference airfoils overlie each other to the maximum extent possible.

In the initial relationship, for example the relationship shown in FIG. 10, the leading end 208 of one of the mean camber lines 200 is disposed on the other mean camber line 160 and the trailing end 206 of the other mean camber line 160 is disposed on the one mean camber line 200. The mean camber lines are then shifted relative to each other through a plurality of relationships (FIGS. 11-14). In each of these relationships, the leading end of one of the mean camber lines is disposed on the other mean camber line and the trailing end of the other mean camber line is disposed on the one mean camber line.

To determine a best fit relationship, the extent to which points on surfaces of the measured airfoil 22 are offset relative to corresponding points on surfaces of the reference airfoil 142 is determined for each of the plurality of relationships between the mean camber lines 160 and 200. Alternatively, if desired, a best fit relationship may be determined by determining the extent to which points on the mean camber line 160 of the measured airfoil 22 are offset relative to corresponding points on the mean camber line 200 of the reference airfoil 142 for each of the plurality of relationships between the mean camber lines. Although it is preferred to use the mean camber lines 160 and 200 for comparison purposes, other lines having configurations which are functions of the configurations of the major side surfaces 80, 82 and 154, 156 of the airfoils 22 and 142 could be used if desired.

Having described specific preferred embodiments of the invention, the following is claimed:

1. A method of determining how closely the cross sectional configuration of an airfoil corresponds to a reference cross sectional configuration, said method comprising the steps of measuring the airfoil in a plane extending transversely to a central axis of the airfoil, determining data representative of the mean camber line of the measured airfoil, establishing an initial relationship between the data representative of the measured airfoil mean camber line with data representative of a mean camber line for a reference airfoil, changing the relationship between the data representative of the measured airfoil mean camber line and the data representative of the reference airfoil mean camber line from the initial relationship to each of a plurality of different relationships, and determining at which of the relationships between the data representative of the measured airfoil mean camber line and the data representative of the reference airfoil mean camber line there is a best fit condition in which surfaces of the airfoils overlie each other to the maximum extent possible.

2. A method as set forth in claim 1 wherein said step of determining at which of the relationships there is a best fit condition includes the steps of determining the extent to which points on the measured airfoil are displaced from points on the reference airfoil at each of the plurality of relationships.

3. A method as set forth in claim 1 wherein said step of determining at which of the relationships there is a best fit condition includes the steps of determining the extent to which points on the measured airfoil mean camber line are displaced from points on the reference airfoil mean camber line at each of the plurality of relationships.

4. A method as set forth in claim 1 further including the steps of determining leading and trailing ends for the reference and measured airfoil mean camber lines, said step of establishing an initial relationship between the data representative of the measured and reference airfoil mean camber lines includes the steps of changing the relationship between the data representative of the airfoil mean camber lines until the leading end of one of the mean camber lines is disposed on the other mean camber line and the trailing end of the other mean camber line is disposed on the one means camber line.

5. A method as set forth in claim 1 further including the steps of determining leading and trailing ends for the reference and measured airfoil mean camber lines, said steps of establishing an initial relationship and changing the relationship between the data representative of the measured and reference airfoil mean camber lines includes the steps of establishing an initial relationship between the data representative of the airfoil mean camber lines in which the leading end of a first one of the mean camber lines is disposed on a second one of the mean camber lines and the trailing end of the second mean camber line id disposed on the first mean camber line and sequentially changing the relationship between the data representative of the airfoil mean camber lines from the initial relationship to a plurality of relationships in each of which the leading end of one of the mean camber lines is disposed on the other mean camber line and the trailing end of the other mean camber line is disposed on the one mean camber line.

6. A method as set forth in claim 1 wherein said step of determining the mean camber line of the measured airfoil includes the steps of determining data representative of the locations of a pair of lines representing opposite major side surfaces of the measured airfoil and determining data representative of the locations of a plurality of circles each of which is tangent to a point on a line representing one major side surface of the measured airfoil and to a point on a line representing the other major side surface of the measured airfoil.

7. A method as set forth in claim 1 wherein said step of measuring the airfoil includes the steps of selecting a datum surface, locating intersecting measurement axes relative to the datum surface and determining the distance of a plurality of points on opposite major side surfaces of the measured airfoil from the measurement axes, said step of changing the relationship between the data representative of the measured airfoil mean camber line and the reference airfoil mean camber line including changing the angular relationship between data representative of the measurement axes and intersecting axes of the reference airfoil to effect rotational displacement between the data representative of the measured airfoil mean camber line and the reference airfoil mean camber line.

8. A method as set forth in claim 1 wherein said step of measuring the airfoil includes the steps of selecting a datum surface, locating intersecting measurement axes relative to the datum surface and determining the distance of a plurality of points on opposite major side surfaces from the measurement axes, said step of changing the relationship between the data representative of the measured airfoil mean camber line and the reference airfoil mean camber line including changing the relationship between the data representative of the origin of the measurement axes and the origin of intersecting axes of the reference airfoil to effect displacement between the data representative of the measured airfoil mean camber line and the reference mean camber line.

9. A method of determining how closely the cross sectional configuration of a first airfoil corresponds to the cross sectional configuration of a reference airfoil, said method comprising the steps of measuring the first airfoil in a plane extending transversely to a central axis of the first airfoil, determining data representative of a first line having a configuration which is a function of the configuration of major side surfaces on the first airfoil in the measurement plane, determining data representative of a second line having a configuration which is a function of the configuration of major side surfaces of the reference airfoil in a plane corresponding to the measurement plane, establishing an initial relationship between the data representative of the first and second lines, changing the relationship between the data representative of the first and second lines from the initial relationship to each of a plurality of relationships, and determining for which of the relationships there is a minimum deviation between the points on the major side surfaces of the measured airfoil and corresponding points on the major side surfaces of the reference airfoil.

10. A method as set forth in claim 9 further including the steps of determining leading and trailing ends for the first and second lines, said step of establishing an initial relationship between the first and second lines includes shifting data representative of the lines relative to each other until the leading end of one of the lines is disposed on the other line and the trailing end of the other line is disposed on the one line.

11. A method as set forth in claim 9 further including the steps of determining leading and trailing ends for the first and second lines, said step of establishing an initial relationship and changing the relationship between data representative of the first and second lines includes the steps of obtaining an initial relationship between the data representative of the first and second lines in which the leading end of one of the lines id disposed on the other of the lines and the trailing end of the other line is disposed on the one line and changing the relationship between the data representative of the first and second lines from the initial relationship to a plurality of relationships.

12. A method as set forth in claim 9 wherein said step of determining for which of the relationships there is a minimum deviation between points on the measured and reference airfoils includes the step of determining for which relationship of the initial relationship and plurality of relationships the offset between the data representative of the first and second lines is a minimum.

13. A method as set forth in claim 9 wherein said step of determining for which of the relationships there is a minimum deviation between points on the measured and reference airfoils includes the step of determining for which relationship of the initial relationship and plurality of relationships includes the steps of determining the extent to which points on the major side surfaces of the measured airfoil are displaced from corresponding points on the major side surfaces of the reference airfoil.

14. A method of determining how closely the cross sectional configuration of a selected airfoil corresponds to the cross sectional configuration of a reference airfoil, said method comprising the steps of determining data representative of mean camber lines and their leading and trailing ends for the selected and reference airfoils, shifting the data representative of the mean camber lines relative to each other through a plurality of relationships in each of which a leading end of one of the mean camber lines is disposed on the other mean camber line and the trailing end of the other mean camber line is disposed on the one mean camber line, and comparing the relationship between points associated with the selected airfoil with corresponding points associated with the reference airfoil at the initial and each of the plurality of relationships.

15. A method as set forth in claim 14 wherein said step of comparing the relationship between points associated with the selected and reference airfoils includes the step of comparing points on the mean camber line of the selected airfoil with corresponding points on the mean camber line of the reference airfoil.

16. A method as set forth in claim 14 wherein said step of comparing the relationship between points associated with the selected and reference airfoils includes the step of comparing points on a major side surface of the selected airfoil with corresponding points on a major side surface of the reference airfoil.

17. A method as set forth in claim 14 further including the step of determining at which of the relationships between the data representative of the airfoil mean camber lines the points associated with the reference airfoil correspond most closely to the points associated with the selected airfoil to thereby determine a best fit relationship in which the cross sectional configurations of the selected and reference airfoils most closely correspond to each other.

* * * * *

UNITED STATES PATENT AND TRADEMARK OFFICE
CERTIFICATE OF CORRECTION

PATENT NO. : 4,908,782
DATED : March 13, 1990
INVENTOR(S) : Herbert C. Pekarek, Richard D. Pryatel It is certified that error appears in the above-identified patent and that said Letters Patent is hereby corrected as shown below:

Column 1, line 28, after "measured" insert --.--;
Column 11, line 31, page 27, line 20, after "line" insert
            --200--;
Column 12, line 42, delete "means" and insert
            --mean-- therefor;
Column 12, line 54, delete "id" and insert --is--
            therefor;
Column 14, line 4, delete "id" and insert --is--
            therefor;

Signed and Sealed this

Twentieth Day of July, 1993

Attest:

MICHAEL K. KIRK

Attesting Officer    Acting Commissioner of Patents and Trademarks